United States Patent [19]

Wroblewski

[11] 4,434,913
[45] Mar. 6, 1984

[54] CYCLICAL MECHANICAL DISPENSING MECHANISM

[76] Inventor: Lucien J. Wroblewski, 8438 N. Kedvale Ave., Skokie, Ill. 60076

[21] Appl. No.: 307,486

[22] Filed: Oct. 1, 1981

[51] Int. Cl.³ ............................................. B65G 59/00
[52] U.S. Cl. .................................... 221/267; 221/273
[58] Field of Search ............... 221/267, 273, 272, 268, 221/208; 133/4 R; 222/505

[56] References Cited

U.S. PATENT DOCUMENTS

| | | | |
|---|---|---|---|
| 1,247,664 | 11/1917 | Giles | 221/267 |
| 2,824,361 | 2/1958 | Brown | 221/267 |
| 3,565,285 | 2/1971 | Asnes | 221/267 |
| 3,854,626 | 12/1974 | Krechmar | 221/273 |

OTHER PUBLICATIONS

Dura-Scape "Part Escapement Devices", Model BC-2A; Automation Associates Inc.; 900 Westgate Dr., Addison, IL 60101.
"Typical Feeders . . . Six Ways to Feed Aligned Parts", one page.

Primary Examiner—Joseph J. Rolla
Assistant Examiner—Kenneth Noland
Attorney, Agent, or Firm—Hill, Van Santen, Steadman & Simpson

[57] ABSTRACT

A mechanical dispensing device, suitable for dispensing miniature elements, comprises a cyclically driven finger element having a cam follower member which rides over a cam surface to produce a generally rectangular motion path for the finger during each cycle of dispensing operation. The finger is positioned across a feed flow line in which a series of individual elements to be dispensed are stacked from a spring biased latch member which serves as a stopping point for the leading element in the feed line. During dispensing operation, the finger engages a suitable notch space occurring in the stacked elements and draws the leading element through the latch point. The finger then withdraws from engagement with the element, enabling the element to freely drop by gravity through a suitable guide tube into an associated receptacle to be filled. The finger is then returned to an initial position for the dispensing process to repeat.

18 Claims, 10 Drawing Figures

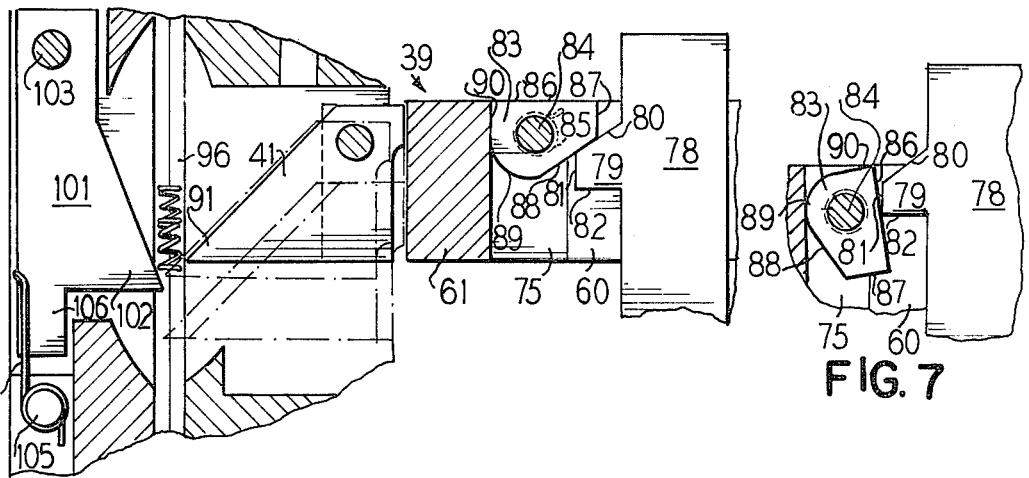
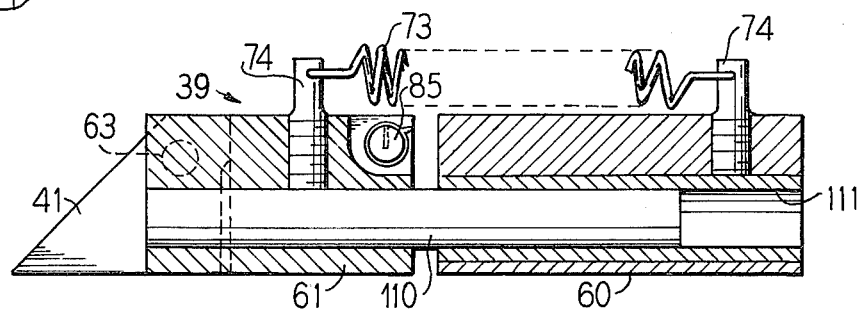
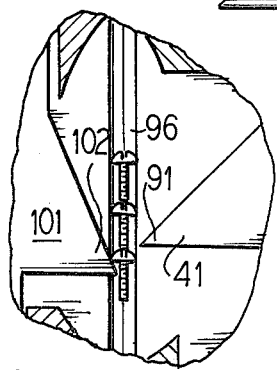
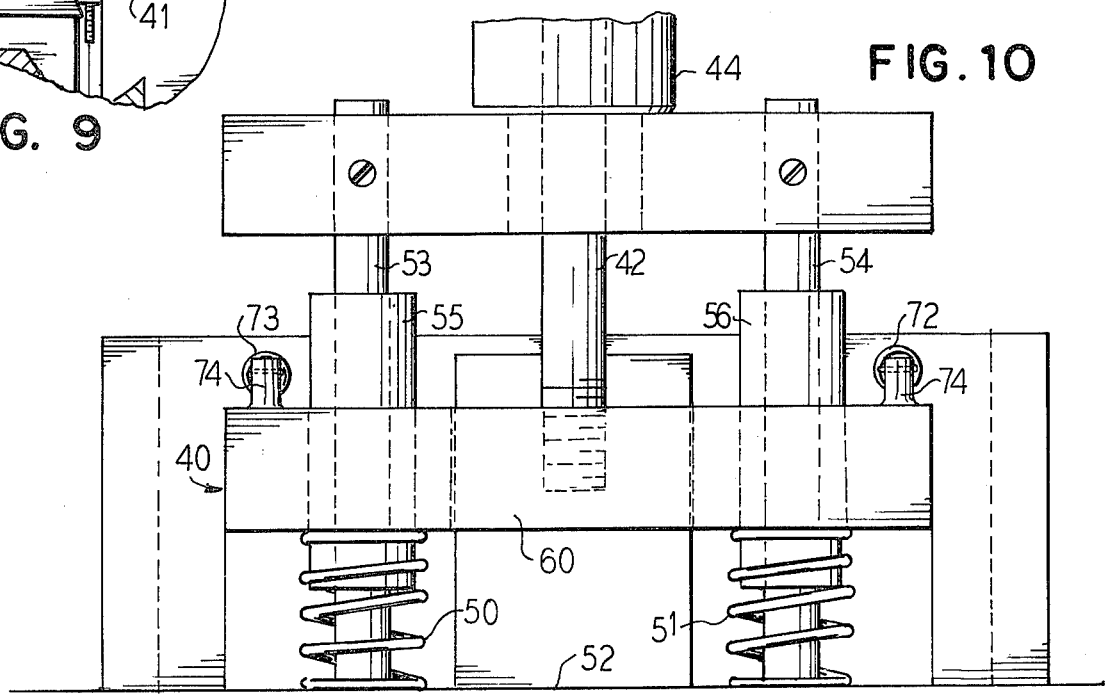

CYCLICAL MECHANICAL DISPENSING MECHANISM

BACKGROUND OF THE INVENTION

The invention relates to a device for cyclically dispensing miniature elements and, more particularly, to a mechanical arrangement therefor affording an accurate, highspeed, and economical dispensing operation. The inventor's employer, Wes-Tech, Inc., an Illinois corporation, shall have a non-exclusive, non-transferable shop-right to make the invention for its own use and incorporate the invention in products sold by Wes-Tech.

There is a need in the assembly of miniature devices or components, such as microswitches, to cyclically dispense miniature parts into or onto corresponding unfinished product portions being passed along an assembly line conveyor belt. Typical present practice has been to utilize a vacuum air pressure operated system to dispense individual miniature parts into corresponding assembly pieces being passed in seriatim on a conveyor line. One such air pressure arrangement, manufactured by Manan Manufacturing Company, Inc., of Skokie, Ill., comprises a supply chamber filled with miniature elements to be loaded which is pressurized such that the elements are agitated. A rotating pick-up arm is formed with a pick-up finger portion connected to a vacuum. The arm first aligns itself with the supply chamber and then inserts the pick-up finger portion into the chamber for retrieval of one element from the chamber. When the finger obtains an element, the arm is then removed from the chamber and indexed over a conveyor line, whereupon vacuum pressure is released and the element is deposited into an unfinished machine part. The system is arranged so that three supply chambers are used and the rotating member is formed with four arms spaced 90° from one another, so that, for every 90° of indexing of the arm assembly, three of the arms contain elements and the remaining arm deposits an element into the corresponding machine part. This type of air pressure operated dispensing arrangement has a relatively high error rate, being approximately 90% consistent at loading, due to the random nature of retrieving elements from the supply chambers onto the pick-up arms. In addition, as in the case of all air pressure operated dispensing mechanisms, the system is relatively expensive to operate because of the quantity of shop air involved and has a relatively high production cost as a result of the many parts.

The present invention is directed to an essentially mechanical arrangement for dispensing miniature elements. The inventive system is relatively compact and inexpensive to operate. In addition, the mechanical dispensing arrangement is nearly 100% reliable.

SUMMARY OF THE INVENTION

A mechanical dispensing device utilizes a reciprocally driven finger element having a cam follower member which rides over a cam surface to produce a generally rectangular motion path for the finger during each cycle of dispensing operation. A series of miniature elements, such as coil springs or screws, are fed in seriatim via a vibratory bowl feed device to a spring-loaded latch which extends across the flow path of the miniature elements. As the finger is driven, a leading end of the finger element enters into a notch space, which may be intermediately of a spring or the area between adjacent screw heads, and drives an individual element downwardly passed the latch. When the element has passed the latch, the leading end of the finger is withdrawn and the element drops by gravity though a guide tube into a suitable receptacle formed on a machine part. The machine part may be one of a series of such parts being transferred beneath the dispensing mechanism on a filling line conveyor.

BRIEF DESCRIPTION OF THE DRAWING

FIG. 5 is a diagrammatical view illustrating the motion path for a finger element of the mechanical dispensing mechanism of FIG. 2 during one cycle of dispensing operation.

FIG. 6 is a cross-sectional view taken along the lines VI—VI of FIG. 2.

FIG. 7 is a fragmentary cross-sectional view showing the position of the cam follower during upward movement of the finger element in operation of the mechanical dispensing mechanism of FIG. 2.

FIG. 8 is a cross-sectional side elevational view of a finger element of the mechanical dispensing mechanism of FIG. 2.

FIG. 9 is a fragmentary, cross-sectional view illustrating the flow path of miniature elements before the mechanical dispensing mechanism of the present invention when miniature screws are being dispensed, as an alternative to miniature springs.

FIG. 10 is a fragmentary, cross-sectional rear view of the mechanical dispensing mechanism of FIG. 2.

DESCRIPTION OF THE PREFERRED EMBODIMENTS

Figure 1:
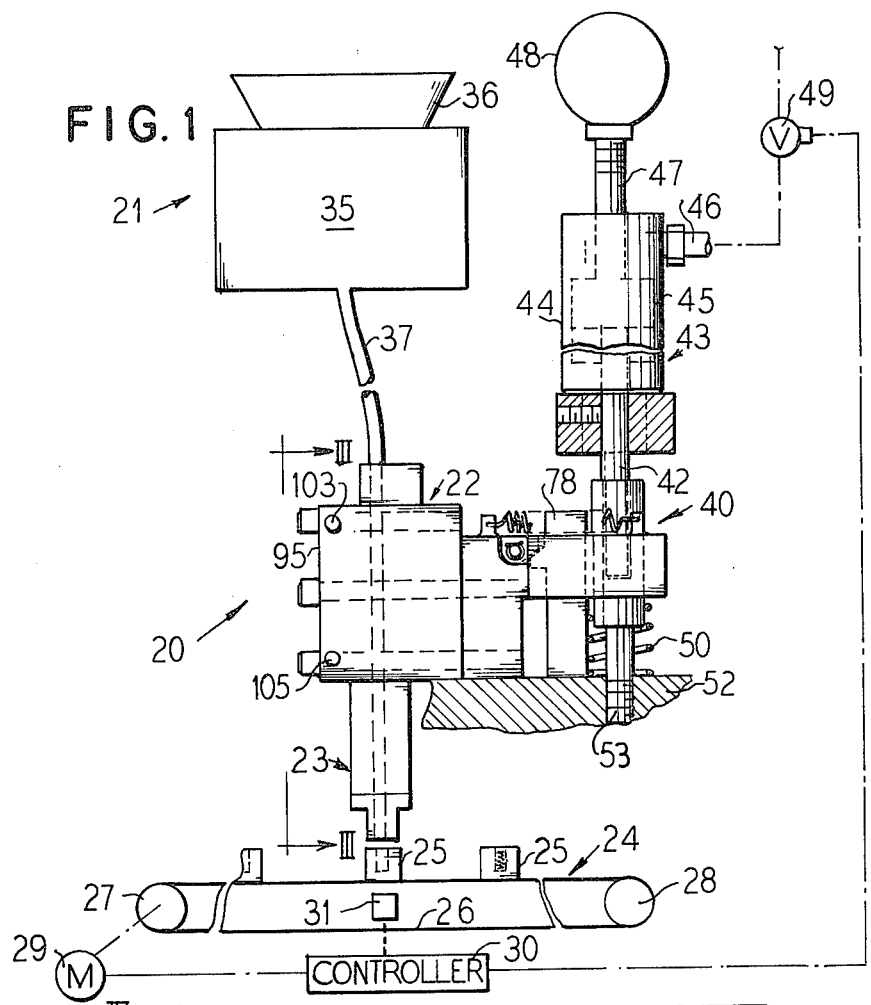
FIG. 1 is a partly broken away, cross-sectional side elevational view of a system for dispensing miniature elements constructed in accordance with the present invention.
Figure 2:
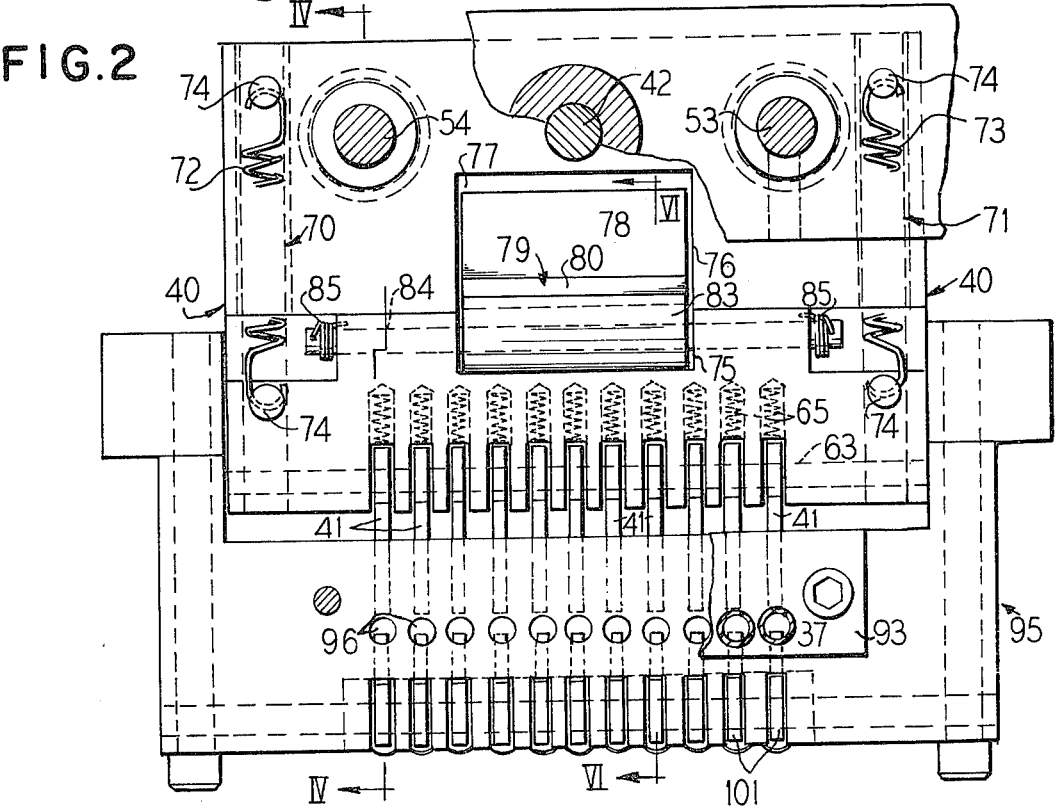
FIG. 2 is a partly broken away plan view of the mechanical dispensing mechanism of FIG. 1.
Figure 3:
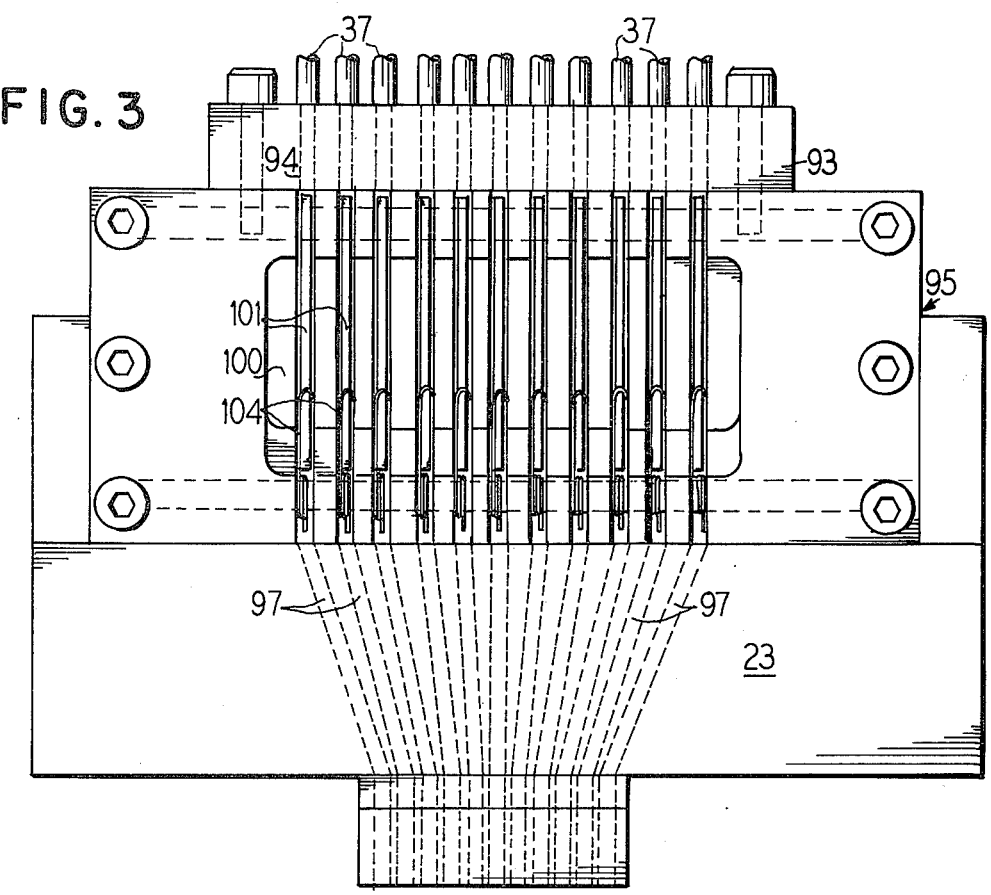
FIG. 3 is a cross-sectional view taken along the lines III—III of FIG. 1.

The invention relates to a mechanical dispensing system 20, shown in FIG. 1, in which a supply of miniature elements, such as small coil springs, are fed seriatim from a vibratory bowl feed device 21 to a mechanical dispensing mechanism 22. The dispensing mechanism 22 serves to cyclically remove a lead miniature element from the supply feed path and cause it to drop by gravity through a guide tube 23 overlying a conveyor line 24 for deposit into a suitable receptacle formed in an unfinished machine part 25, such as a microswitch, carried along on the conveyor line in the course of assembly of the machine part.

The conveyor line 24 comprises as assembly line conveyor belt 26 trained about opposed end rollers 27 and 28, one of which is driven for endless rotation of the conveyor belt via a suitable rotary motor 29. The motor 29 is cyclically operated by means of a suitable control mechanism 30 having a signal device 31, such as an electric eye or limit switch, for causing the control 30 to stop the motor 29 whenever an unfinished machine part 25 is suitably located beneath the delivery end of the guide tube 23.

The vibratory feed device 21 is of conventional construction having a supply chamber 35 formed at its upper end with a feed chute 36 and connected at its lower end with flexible feed tube means 37 for serially conducting the miniature elements stacked one on top of the other to the dispensing mechanism 22. The feed tube means 37 comprises a plurality of individual tubes and machine parts 25 are passed along on the conveyor belt 26 in suitable corresponding rows so that a plurality of parts can be loaded during each cycle of dispensing operation of the dispensing mechanism 22.

With reference to FIGS. 1-4 and 10, the dispensing mechanism 22 utilizes a cyclically movable finger means 39 comprising a support block member 40 fitted at a forward end with a plurality of outwardly extending, parallel finger elements 41. The finger means 39 is cyclically stroked by a suitable drive means. Here, for purposes of illustration, the support block 40 is connected for reciprocation to the lower end of a piston rod 42. The piston rod 42 is connected to a single-acting fluid piston motor 43 comprising a cylinder block 44 in which is mounted a piston 45 having an upper surface cyclically pressurized with pressure air fed through a control line 46 to permit automatic operation of the dispensing mechanism 22. The piston 45 is formed with a further rod member 47 having a knob 48 formed at its outer free end to permit manual dispensing when desired. Pressurized air is sequentially conducted into and out of the cylinder 44 in the work space overlying the piston 45 by virtue of a solenoid actuated distributor valve 49 fitted in the flow line 46. The valve 49 is passed between air input and air discharge positions upon suitable signals from the control mechanism 30, such that the finger means 39 is depressed for dispensing when a row of unfinished machine parts 25 is suitably positioned beneath the guide tube 23 and permitted to retract upward for return of the finger means to an original position as the next set of unfinished machine parts are conducted toward suitable positions beneath the guide tube means 23. The return stroke of the finger means 39 is brought about by a pair of coil spring members 50 and 51 extending between a stationary shelf surface 52 and the bottom surface of the support block 40. In order to assure properly aligned vertical movement of the support block and fingers of the dispensing mechanism during each cycle of dispensing operation, stationary guide rods 53 and 54 extend upwardly from the shelf surface 52 through corresponding bores formed in the support block. Slide sleeve members 55 and 56 are fixed to support block 40 and extend concentrically about the guide rods 53 and 54, respectively, for relative sliding movement therealong-during reciprocation of the dispensing mechanism support block and finger elements.

The support block is divided into two separate, juxtaposed block parts 60 and 61. The finger elements 41 are mounted respectively in a plurality of forward facing slots 62 formed on the forward block portion 61. A transverse pin member 63 extends through an upper portion of the slots 62 for pinning the finger elements 41 therein. The finger elements 41 are each formed with a rearward wall abutment surface 64 for engaging against a corresponding inner wall surface of the slots 62 and spring means 65 are positioned in the forward block portion 61 for engaging against rearward surface portions of the finger elements 41 to bias the abutment surfaces 64 against the inner surfaces of the slots, such that each finger element is laterally aligned relative to the support block 40 but permitting slight downward rotation about the bar member 63 for reasons described below.

The front and back block portions 61 and 60 are normally held tightly together in lateral alignment with one another by means of a pair of transversely spaced laterally extending connector spring means 70 and 71 mounted adjacent opposed transverse sides of the support block 40. The connector spring means comprise coil spring members 72 and 73, respectively connected between opposed fixed pin members 74, one mounted on the forward block 61 and one mounted on the rearward block 60.

Opposed facing rectangular recesses 75 and 76 are correspondingly formed in the forward block 61 and rearward block 60 defining a vertical rectangular opening 77 extending generally centrally through the support block 40. Upstanding from the shelf surface 52 is a fixed wall surface 78 which is received in the support block opening 77. A forward face of the wall 78 is formed with an outwardly protruding cam surface 79. With reference to FIG. 6, the cam surface 79 has a downwardly sloping upper wall portion 80 followed by a vertically planar front surface 81 with a laterally flat bottom surface 82 extending rearward from the lower edge of the front surface back to the wall 78. Across from the wall 78 in the support block opening 77 is a cam follower 83 mounted for rotation about a pin shaft 84 running laterally through the trailing edge of the forward block 61. The shaft member 84 is torsionally biased in the counterclockwise direction, as viewed in FIG. 6, by means of torsion spring elements 85 connected between exposed edge portions of the forward block 61 and corresponding opposed ends of the shaft. Proceeding clockwise therearound, the cam element 83 is formed with an upper laterally planar surface 86 followed by a vertically planar side edge 87 connected to a laterally downward slanted bottom edge 88 having a slope angle substantially corresponding to the slant angle of the surface 80 of the cam 79. The lower edge of the cam follower surface 88 is connected to a curved surface portion 89 which leads to a vertically planar front wall surface 90 abutting against a corresponding inner wall of the recess 75 to act as a stop for limiting counterclockwise rotation of the cam follower 83.

Figure 4:
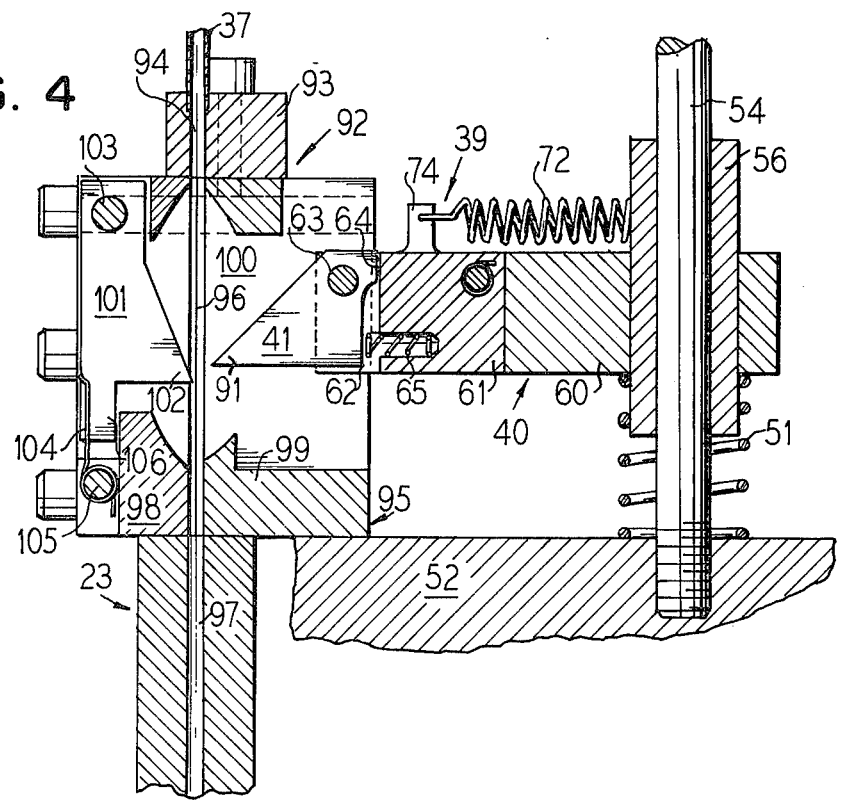
FIG. 4 is a cross-sectional view taken along the lines IV—IV of FIG. 2.

The finger elements 41 are formed with substantially pointed grip edges 91 at the outwardly leading ends thereof. These leading edges 91 extend into a leading end housing portion 92 of the dispensing mechanism 22 which serves as a feed chamber from which miniature elements are individually dispensed into the guide tube 23 for appropriate deposit into the unfinished machine parts being conducted along the conveyor line 24. As shown in FIG. 4, the feed chamber housing 92 comprises an entry block 93 with a plurality of vertically extending delivery holes 94 for correspondingly receiving the outlet ends of feed tubes 37 through which the supply of miniature elements are conducted. Between the entry block 93 and the guide tube 23 is a main chamber housing 95 formed with a plurality of vertical channels 96 for connecting the entry block ducts 94 with a corresponding plurality of delivery ducts 97 formed in the guide tube 23 and leading to the conveyor line 24. The flow of miniature elements through each of the feed tubes 37, the entry block ducts 94, and the channels 96 serve to define feed line paths for miniature elements from the supply chamber 35 down to the delivery ducts 97.

The main chamber housing 95 is preferably formed of two juxtaposed lateral parts 98 and 99 bolted together and defining intermediately thereof a cavity 100. From the right side as shown in FIG. 4, the finger elements 41 extend into the cavity 100 with the leading edges 91 facing toward the feed channels 96 in slightly spaced relation. On the left side of the chamber part 98, as shown in FIG. 4, there is provided a plurality of individual latch members 101 having substantially pointed leading edges 102 facing across from the finger element edges 91 and extending into corresponding respective feed channels 96 to serve as stops or gates in the flow of miniature elements to the delivery ducts 97. Each latch 101 is pinned for pivotal movement adjacent its upper end on a transversely extending pivot bar 103 mounted in the housing part 98. The latches 101 are biased in a counterclockwise direction for positioning of their leading edges 102 into the feed channels 96 by individual respective torsion spring means 104 wrapped around a lower pin member 105 and engaging against outer facing edges of the latches. Each latch 101 is formed with a downwardly extending surface for abutting against a stationary wall portion of the housing part 98 to act as a stop for limiting inward, counterclockwise movement of the latches.

For purposes of illustration, it will be assumed that the miniature elements being dispensed are small springs, which may be used in the assembly of microswitches. In accordance with the instant embodiment of the present invention, it is preferable that the miniature elements being dispensed contain notch spaces or openings in each element which can be gripped by the leading edges 91 of the finger elements 41 for extraction from the element feed line and deposit into the delivery ducts 97. One instance of such notch spaces occurs in the free spaces between coils in miniature springs. Alternatively, such notch spaces may be formed between adjacent ends of the miniature elements, such as in the case of a feed line of miniature screws as illustrated in FIG. 9.

Operation of the dispensing mechanism 22 will now be described with reference to FIGS. 1 and 5-8. The feed tubes 37 are filled with miniature spring elements stacked one upon the other with leading springs stopped against the pointed gate edges 102 of the latch members 101 in the feed channels 96. Starting with the finger means 39 positioned as shown in the solid line configuration of FIG. 6, the support block 40 is in an upraised position such that the slanted bottom surface of the cam follower 83 faces the slanted upper wall of the cam 79. Dispensing of each leading spring in the element feed line begins when the control 30 signals stoppage of the conveyor motor 29, as the result of alignment of unfinished machine parts 25 beneath the corresponding outlet ends of the delivery ducts 97, and switching of the distributor valve 49 to permit a flow of pressurized air to enter the motor cyclinder 44 forcing downward movement of the piston 45 and, accordingly, the finger means 39. As the support block is passed downwardly, the cam follower surface 88 passes along the cam surface 80, causing outward lateral movement of the block part 61 relative to the rear block part 60 against the bias of the connecting springs 72 and 73. The lateral outward and downward movement of the support part 61 and associated finger elements 41 causes each leading gripping edge 91 to pass from point A to point B, as shown in FIG. 5. At point B, the pointed edges 91 engage directly into the coil spaces of the leading springs and the vertical side edge 87 of the cam follower 83 now engages against the planar front surface 81 of the cam 79. The springs 65 engaging the finger members 41 afford resilience to the protrusion of the gripping edges 91 into the element feed channels permitting some play of the fingers as they engage the corresponding notch spaces as a precaution against possible damaging interference with solid portions on the elements. At point B, the leading block part 61 is laterally separated at a maximum distance from the trailing block part 60, as shown in FIG. 8. Back and forth lateral movement of the leading block part 61 relative to the trailing block part 60 proceeds with both support blocks remaining laterally aligned, so as to be vertically displaced simultaneously, by virtue of lateral guide bars 110 fixedly mounted at opposed transverse sides of the leading block part 61 with rearwardly facing free ends slidably disposed in corresponding lateral channels 111 formed in corresponding transversely opposed side surfaces of the rear block part 60.

The piston motor 43 continues downward movement of the support block 40, whereupon the cam follower surface 87 slides along the cam surface 81 and the leading grip edges 91 of the finger elements 41 proceed along a vertically downward path parallel with the corresponding feed channels 96 between point B and point C, as shown in FIG. 5. During this downward travel of the finger elements 41, the leading springs in each feed line are drawn past the interfering gate edges 102 of the latches 101. As the spring elements are drawn past the latch gate edges, the latches 101 are biased against the force of the torsion springs 104 in clockwise rotation. The vertical drop between point B and point C is set so that, when the gripping edges 91 of the fingers 41 reach point C, the elements being dispensed have been pulled fully beneath the stop edges 102 of the latches 101. At this time, the biasing force of the torsion springs 104 cause the latches to be returned into interfering protrusion in the feed channels 96 so that the succeeding lines of elements are again temporarily held against further downward displacement. When the grip edges 91 reach point C, cam follower surface 87 will have passed fully along cam surface 81, such that the biasing forces of the connecting springs 72 and 73 retract the block part 61 once again into mating engagement with the rearward block part 60. The gripping edges 91 pass from point C to point D as shown in FIG. 5, guided by sliding movement of the upper surface 86 of the cam follower 83 along the lateral bottom wall 82 of the cam 79. This rearward movement of the block part 61 causes removal of the gripping edges 91 out of the feed channel 96 and engagement with the elements being dispensed, whereupon the elements drop in free fall fashion through the remainder of the element flow path and out of the delivery ducts 97 into the corresponding receptacle zones in the row of unfinished machine parts 25 suitably aligned beneath the guide tube 23.

With the unfinished machine parts now filled with corresponding dispensed elements, the control signals resumption of operation of the conveyor belt motor 29 to index another set of unfilled machine parts beneath the guide tube delivery ducts 97 and signals switching of the distributor valve 49 to release pressurized air above the motor piston 45 to ambient, causing a return upward stroke of the finger means 39 under the influence of the springs 50 and 51. This resumption of operation of the motor 29 and triggering of the distributor valve 49 may be brought about by any suitable timing mechanism or circuit built into the control 30 correlated with the dispensing operation.

During the return stroke of the support block 40, the cam follower 83 is rotated clockwise approximately 90° against the bias of the torsion springs 85 to prevent interference of the cam follower with the cam surface 79. During this movement, the cam follower surface 86 engages with the cam bottom surface 82 and then rides along the front wall surface 81 of the cam. The curved follower surface portion 89 passes over the adjacent inner surface of the recess 75. The upward stroke of the support block 40 elevates the gripping edges 91 of the fingers 41 from point D to point E shown in FIG. 5. At point E, cam follower surface 87 overlies the upper surface 80 of the cam 79, such that the bias of the torsion springs 85 causes the cam follower 83 to undergo a return rotation of approximately 90° in the counter-clockwise direction. The cam follower 83 is then righted to its normal position with cam follower surface 86 facing vertically upward and the dispensing operation may repeat. By virtue of the vertical stroking of the finger means 39 and control of the motion involved by the cam surfaces, the finger elements 41 are passed through a substantially rectangular motion path during each cycle of dispensing operation.

Actuation of the dispensing mechanism 22 occurs in cyclical fashion at relatively high speed. The mechanical dispensing system 20 of the present invention is an accurate and reliable arrangement readily compatible with the requirements of production line assembly. While the dispensing mechanism 22 is suitable for the cyclical dispension of miniature elements into suitable unfinished part receptacles, those skilled in the art will readily appreciate that the present invention may also have application in other high-speed dispensing operations, including the feeding of relatively large production pieces into unfinished machine parts.

The present invention affords a mechanical dispensing arrangement which is relatively inexpensive to construct and operate. While a single-acting piston air motor has been described for cyclical stroking of the finger element support block 40, those skilled in the art will readily appreciate that other forms of cyclical drives may be used, possibly foregoing the need for a supply of pressurized air and representing a cost saving in that regard.

Although various minor modifications may be suggested by those versed in the art, it should be understood that I wish to embody within the scope of the patent warranted hereon all such modifications as reasonably and properly come within the scope of my contribution to the art.

I claim as my invention:

1. Apparatus for cyclically dispensing elements individually from a serial feed path comprising:
a finger means having a leading edge for engaging a lead element in said feed path,
a resiliently biased latch means having a gate edge for extending into said feed path to halt passage of said lead element from said feed path,
a drive means for cyclically stroking said finger means though a motion path, and
a cam means associated with said finger means, said cam means comprising a cam follower slidable over a fixed cam surface in one stroke direction of said finger means for passing said finger means whereby said leading edge passes from an initial position to engage said lead element and draw it past said gate edge against the bias of said latch means, and then said cam follower is rotatable relative to said cam surface and said finger means in another stroke direction of said finger means such that said leading edge releases said lead element and returns to said initial position during each stroke cycle.

2. The apparatus of claim 1, wherein said motion path of the leading edge is substantially rectangular.

3. The apparatus of claim 1, wherein said drive means reciprocates said finger means.

4. The apparatus of claim 1, wherein said elements are each formed with notch spaces for receiving said leading edge.

5. The apparatus of claim 1, wherein said elements define notch spaces therebetween for receiving said leading edge.

6. The apparatus of claim 1, wherein said cam follower is torsion biased mounted for rotation on said finger means and slides over said cam surface during a first portion of said stroke cycle and rotates during a second portion of said stroke cycle.

7. The apparatus of claim 6, wherein said cam follower is formed with a stop edge for abutting against a corresponding surface on said finger means to limit rotation of said cam follower under the influence of the torsion bias.

8. The apparatus of claim 7, wherein said cam follower is formed with adjacent laterally sloped and vertical surfaces for sliding respectively over associated laterally sloped and vertical surfaces formed on said cam surface and is formed with an upper lateral surface for engaging against a bottom lateral surface formed on said cam surface.

9. The apparatus of claim 8, wherein said finger means comprises first and second separable portions in biased engagement with one another and defining therebetween an opening containing said cam means, said first and second portions being spaced from one another during said first portion of said stroke cycle and juxtaposed with one another during said second portion of said stroke cycle.

10. Apparatus for dispensing comprising:
a feed line containing elements to be dispensed stacked one on top of another,
a finger means having grip means for engaging a lead element in said feed line,
a latch means extending into said feed line for abutting against said lead element to prevent passage of said elements therepast,
a drive means for stroking said finger means, and
a means for directing motion of said finger means during stroking by said drive means comprising cooperating cam and cam follower surfaces, said cam being mounted on separate support means, said cam follower being mounted on said finger means and supported for rotation on a torsionally biased shaft means, said cam follower sliding over said cam in one direction of motion during a first portion of the stroking of said finger means and being rotated against the torsion bias by engagement with said cam in the opposite direction of motion during a second portion of the stroking of said finger means.

11. The apparatus of claim 10, further comprising a delivery duct means connected to said feed line for conducting said released lead element by gravity to a discharge point.

12. The apparatus of claim 11, further comprising an assembly line conveyor means for bringing a receptacle element to said discharge point to receive therein said released lead element.

13. The apparatus of claim 10, wherein said latch means is formed with a gate edge resiliently biased into said feed line.

14. The apparatus of claim 11, wherein said grip means engages, transfers, and releases said lead element during said first portion of the stroking and returns to an initial position during said second portion of the stroking.

15. The apparatus of claim 10, wherein said drive means cyclically reciprocates said finger means.

16. The apparatus of claim 10, wherein said elements are miniature coil springs.

17. The apparatus of claim 10, wherein said elements are miniature screws stacked end to end in said feed line.

18. The apparatus of claim 10, wherein said finger means comprises a plurality of parallel, spaced grip means and there are a plurality of feed lines containing elements to be dispensed and latch means cooperatively respectively associated with said plurality of grip means.

* * * * *